United States Patent
Lee et al.

(10) Patent No.: US 11,603,462 B2
(45) Date of Patent: Mar. 14, 2023

(54) METHOD FOR PREPARING BLOCK COPOLYMER COMPOSITION, AND ASPHALT COMPOSITION COMPRISING BLOCK COPOLYMER COMPOSITION PREPARED THEREBY

(71) Applicant: LG Chem, Ltd., Seoul (KR)

(72) Inventors: Seong Du Lee, Daejeon (KR); Tae Jung Kim, Daejeon (KR); Se Kyung Lee, Daejeon (KR); Chun Hwa Lee, Daejeon (KR)

(73) Assignee: LG Chem, Ltd.

( * ) Notice: Subject to any disclaimer, the term of this patent is extended or adjusted under 35 U.S.C. 154(b) by 401 days.

(21) Appl. No.: 16/637,008

(22) PCT Filed: Nov. 15, 2018

(86) PCT No.: PCT/KR2018/014040
§ 371 (c)(1),
(2) Date: Feb. 6, 2020

(87) PCT Pub. No.: WO2019/098724
PCT Pub. Date: May 23, 2019

(65) Prior Publication Data
US 2020/0165441 A1    May 28, 2020

(30) Foreign Application Priority Data

Nov. 17, 2017  (KR) .......................... 10-2017-0153820
Nov. 8, 2018   (KR) .......................... 10-2018-0136621

(51) Int. Cl.
C08L 53/02    (2006.01)
C08F 297/04   (2006.01)

(52) U.S. Cl.
CPC .......... *C08L 53/02* (2013.01); *C08F 297/044* (2013.01); *C08F 2810/20* (2013.01); *C08L 2555/84* (2013.01)

(58) Field of Classification Search
CPC .. C08L 53/02; C08L 2555/84; C08F 2810/20; C08F 297/044
See application file for complete search history.

(56) References Cited

U.S. PATENT DOCUMENTS

| | | | |
|---|---|---|---|
| 5,213,439 | A | 5/1993 | De Keyzer |
| 2006/0122343 | A1 | 6/2006 | Koch et al. |
| 2006/0189479 | A1 | 8/2006 | Even et al. |
| 2008/0275183 | A1 | 11/2008 | Kluttz et al. |
| 2009/0182075 | A1 | 7/2009 | Kim et al. |
| 2010/0016508 | A1 | 1/2010 | Sasagawa et al. |
| 2010/0130671 | A1 | 5/2010 | Tadaki et al. |
| 2011/0319568 | A1 | 12/2011 | Yu et al. |
| 2012/0196996 | A1 | 8/2012 | Moctezuma Espiricueto et al. |
| 2016/0326371 | A1 | 11/2016 | Seo et al. |
| 2016/0333132 | A1 | 11/2016 | Shiromoto et al. |
| 2017/0210841 | A1* | 7/2017 | Moctezuma Espiricueto .............. C08L 95/005 |

FOREIGN PATENT DOCUMENTS

| | | |
|---|---|---|
| CN | 101440218 A | 5/2009 |
| CN | 101675114 A | 3/2010 |
| CN | 103347912 A | 10/2013 |
| EP | 2062940 A1 | 5/2009 |
| JP | H06228250 A | 8/1994 |
| JP | 2017500437 A | 1/2017 |
| JP | 2017025141 A | 2/2017 |
| KR | 20050033638 A | 4/2005 |
| KR | 20060093669 A | 8/2006 |
| KR | 20090031933 A | 3/2009 |
| KR | 20100015342 A | 2/2010 |
| KR | 20120000539 A | 1/2012 |
| KR | 20150016686 A | 2/2015 |
| KR | 20150037452 A | 4/2015 |
| KR | 20150056312 A | 5/2015 |
| KR | 20160101060 A | 8/2016 |
| RU | 2089584 C1 | 9/1997 |
| RU | 2458091 C2 | 8/2012 |
| WO | 2017130065 A1 | 8/2017 |

OTHER PUBLICATIONS

Search Report for Chinese Application No. 201880051309.X dated Dec. 31, 2021. 2 pgs.
Russian Search Report for RU Application No. 2020105626 dated Nov. 12, 2021, 2 pgs.
Boisson, et al., "Lanthanidocene Catalysts for the Homo- and Copolymerization of Ethylene with Butadiene," Macromolecular Chemistry and Physics, Sep. 17, 2003, pp. 1747-1754, vol. 204, No. 14.
International Search Report for Application No. PCT/KR2018/014040 dated Feb. 22, 2019, 2 pages.
Extended European Search Report including Written Opinion for EP18879379.8 dated Dec. 14, 2020; 10 pages.

* cited by examiner

*Primary Examiner* — Robert D Harlan
(74) *Attorney, Agent, or Firm* — Lerner, David, Littenberg, Krumholz & Mentlik, LLP

(57) ABSTRACT

A method of preparing a block copolymer composition is provided. The method includes: adding an aromatic vinyl monomer and a compound represented by Chemical Formula 1 to a hydrocarbon-based solvent and performing stirring to prepare a first mixed solution; adding a polymerization initiator to the first mixed solution and performing polymerization to prepare a second mixed solution; adding a conjugated diene-based monomer to the second mixed solution and performing polymerization to prepare a third mixed solution; and adding a coupling agent to the third mixed solution to perform a coupling reaction, An asphalt composition including the block copolymer composition prepared therefrom, is also provided.

5 Claims, No Drawings

METHOD FOR PREPARING BLOCK COPOLYMER COMPOSITION, AND ASPHALT COMPOSITION COMPRISING BLOCK COPOLYMER COMPOSITION PREPARED THEREBY

CROSS-REFERENCE TO RELATED APPLICATIONS

The present application is a national stage entry under 35 U.S.C. § 371 of International Application No. PCT/KR2018/014040 filed on Nov. 15, 2018, which claims priority to Korean Patent Application No. 10-2017-0153820, filed on Nov. 17, 2017 and Korean Patent Application No. 10-2018-0136621, filed on Nov. 8, 2018, the disclosures of which are incorporated herein in their entirety.

Technical Field

The present invention relates to a method of preparing a block copolymer composition, and more particularly, to a method of preparing a block copolymer composition for use as an asphalt modifier and an asphalt composition including the block copolymer composition prepared therefrom.

Background Art

Asphalt which is a residue remaining after most of the volatile fraction evaporates from the components of crude oil, maintains a highly viscous liquid or semi-solid state at a high temperature, but also has a physical property of hardening at or below room temperature. In addition, since asphalt is very plastic, is highly water-proof, has high electrical insulation, adhesive property, and the like, and has chemically stable properties, it is widely applied to building materials such as road pavement materials or water-proof materials. However, the asphalt has a problem in that when the asphalt is exposed to a high temperature for a long period during its use, plastic deformation occurs, and at a low temperature, cracks occur due to external shock.

In order to solve the problem, recently, research on polymer modified asphalt (PMA) which is modified by adding various polymers has been conducted. The polymer modified asphalt is aimed at improvement of functional natures including permanent deformation, fatigue cracking, cold cracking, aging, and the like. Meanwhile, among the properties of the physical natures of the polymer modified asphalt, a softening point is the most basic physical property of the asphalt. The softening point greatly depends on the properties of a polymer added to the polymer modified asphalt, for example, an aromatic vinyl hydrocarbon-conjugated diene block copolymer such as styrene-butadiene-styrene (SBS) block copolymer, and in order to raise the softening point, research on SBS is constantly conducted.

However, when the softening point of the polymer modified asphalt is raised by adjusting SBS, other physical properties other than the softening point are degraded, and thus, there is a limitation on a rise of the softening point. Accordingly, development of technology for raising the softening point of the polymer modified asphalt while preventing degradation of other physical properties is currently urgent.

DISCLOSURE

Technical Problem

In order to solve the problems mentioned in the background art, the technical problem to be solved in the present invention is to raise a softening point of polymer modified asphalt while maintaining other physical properties at the same or a higher level, when the block copolymer composition is applied as an asphalt modifier.

That is, the present invention has been conceived for solving the problems of the related art, and an object of the present invention is to provide a method of preparing a block copolymer composition included in an asphalt modifier for applying to the polymer modified asphalt, and thus, to provide an asphalt composition by including the block copolymer composition prepared therefrom to maintain the entire physical properties at the same or a higher level while raising a softening point.

Technical Solution

In one general aspect, a method of preparing a block copolymer composition includes: adding an aromatic vinyl monomer and a compound represented by the following Chemical Formula 1 to a hydrocarbon-based solvent and performing stirring to prepare a first mixed solution (S10); adding a polymerization initiator to the first mixed solution and performing polymerization to prepare a second mixed solution (S20); adding a conjugated diene-based monomer to the second mixed solution and performing polymerization to prepare a third mixed solution (S30); and adding a coupling agent to the third mixed solution to perform a coupling reaction (S40), wherein the compound represented by the following Chemical Formula 1 is added in a content of 0.26 parts by weight to 0.8 parts by weight, based on a total content of 100 parts by weight of the aromatic vinyl monomer and the conjugated diene-based monomer:

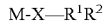      Chemical Formula 1 wherein M may be Li, Na, K, Rb, or Cs; X may be N, O, or S; and $R^1$ and $R^2$ may be independently of each other a monovalent hydrocarbon group having 1 to 12 carbon atoms or a monovalent hydrocarbon group having 1 to 12 carbon atoms containing a N or O atom, but when X is O or S, $R^2$ is absent.

In another general aspect, an asphalt composition includes: a block copolymer composition and asphalt, wherein the block copolymer composition includes a block copolymer including an aromatic vinyl monomer-derived repeating unit block, a conjugated diene-based monomer-derived repeating unit block, and a coupling agent-derived linking group and has a coupling efficiency by the coupling agent-derived linking group of 50% to 80%, and the asphalt composition has a softening point of 71.2° C. or more, as measured according to ASTM D36.

In still another general aspect, an asphalt composition includes: a block copolymer composition, asphalt, and a crosslinking agent, wherein the block copolymer composition includes a block copolymer including an aromatic vinyl monomer-derived repeating unit block, a conjugated diene-based monomer-derived repeating unit block, and a coupling agent-derived linking group, and has a coupling efficiency by the coupling agent-derived linking group of 50% to 80%, and the asphalt composition has a softening point of 83.6° C. or more, as measured according to ASTM D36.

Advantageous Effects

When a block copolymer composition is prepared according to the present invention, and the block copolymer composition prepared therefrom is used as an asphalt modifier, there is an effect of maintaining the entire physical properties of an asphalt composition, that is, polymer modified asphalt at the same or a higher level, while raising a softening point.

BEST MODE

The terms and words used in the description and claims of the present invention are not to be construed as a general or dictionary meaning but are to be construed as meaning and concepts meeting the technical ideas of the present invention based on a principle that the inventors can appropriately define the concepts of terms in order to describe their own inventions in the best mode.

Hereinafter, the present invention will be described in more detail for understanding the present invention.

In the present invention, the term, " . . . derived repeating unit" and " . . . derived linking group" may represent a component or structure caused by a material, or the material itself. As a specific example, " . . . derived repeating unit" may refer to a repeating unit formed in a polymer by the added monomer which participates in a polymerization reaction during polymerization of a polymer, and " . . . derived linking group" may refer to a linking group linking each polymer in coupled polymers by the added coupling agent which participates a coupling reaction during a coupling reaction between the polymers.

In the present invention, the term, "block" may refer to a repeating unit group composed only an identical monomer-derived repeating unit, formed by only identical monomers participating in a polymerization reaction; and as a specific example, an aromatic vinyl monomer-derived repeating unit block may refer to a block formed by only repeating units derived from aromatic vinyl monomers, and a conjugated diene-based monomer-derived repeating unit block may refer to a block formed by only repeating units derived from conjugated diene-based monomers.

In the present invention, the term, "monovalent hydrocarbon group" may refer to a monovalent atom group in which carbon and hydrogen is bonded, such as monovalent alkyl group, alkenyl group, alkynyl group, cycloalkyl group, cycloalkyl group including one or more unsaturated bonds, and aryl group, and the minimum number of carbon atoms of the substituent represented by the monovalent hydrocarbon may be determined depending on the kind of each substituent. The monovalent hydrocarbon group may be unsubstituted or substituted by another hydrocarbon group, and when the monovalent hydrocarbon group is substituted by another monovalent hydrocarbon group, the substituent may satisfy the total number of carbon atoms within the range of the defined number of carbon atoms.

The method of preparing a block copolymer composition according to the present invention includes: adding an aromatic vinyl monomer and a compound represented by the following Chemical Formula 1 to a hydrocarbon-based solvent and performing stirring to prepare a first mixed solution (S10); adding a polymerization initiator to the first mixed solution and performing polymerization to prepare a second mixed solution (S20); adding a conjugated diene-based monomer to the second mixed solution and performing polymerization to prepare a third mixed solution (S30); and adding a coupling agent to the third mixed solution to perform a coupling reaction (S40), wherein the compound represented by Chemical Formula 1 may be added in a content of 0.26 parts by weight to 0.8 parts by weight, based on the total content of 100 parts by weight of the aromatic vinyl monomer and the conjugated diene-based monomer:

$$M-X-R^1R^2 \quad \text{Chemical Formula 1}$$

wherein M may be Li, Na, K, Rb, or Cs; X may be N, O, or S; and $R^1$ and $R^2$ may be independently of each other a monovalent hydrocarbon group having 1 to 12 carbon atoms or a monovalent hydrocarbon group having 1 to 12 carbon atoms containing a N or O atom, but when X is O or S, $R^2$ is absent.

According to an exemplary embodiment of the present invention, step (S10) may be a step for stirring the aromatic vinyl monomer and the compound represented by Chemical Formula 1, before adding the polymerization initiator to initiate polymerization, thereby uniformly dispersing the compound represented by Chemical Formula 1 in the hydrocarbon-based solvent to further improve reactivity when adding the polymerization initiator. Therefore, the first mixed solution prepared from step (S10) may include the aromatic vinyl monomer and the compound represented by Chemical Formula 1 in the hydrocarbon-based solvent.

According to an exemplary embodiment of the present invention, the compound represented by Chemical Formula 1 serves to improve reactivity of a polymerization reaction, when and after polymerization is initiated by the polymerization initiator, and may be a cocatalyst for the polymerization initiator serving as a catalyst of a polymerization reaction. As a specific example, when the compound represented by Chemical Formula 1 is dispersed in a first mixed solution, and then the polymerization initiator is added and the polymerization reaction is initiated according to the subsequent step (S20), exchange of metal ions between the polymerization initiator and the compound represented by Chemical Formula 1 occurs, and during this process, an alkalide in the form of [M:⁻] is produced from an alkali metal represented by M in Chemical Formula 1, whereby there is an effect of improving the entire reactivity of the polymerization reaction by high reactivity of the alkali anion and changing a macrostructure of the block copolymer.

According to an exemplary embodiment of the present invention, in Chemical Formula 1, M may be Na or K; X may be N or O, $R^1$ and $R^2$ may be independently of each other a monovalent hydrocarbon group having 4 to 10 carbon atoms; and when X is O, $R^2$ may be absent. As a specific example, in Chemical Formula 1, M may be Na or K; X may be N or O; $R^1$ and $R^2$ may be independently of each other one selected from the group consisting of n-butyl, iso-butyl, sec-butyl, tert-butyl, n-pentyl, iso-pentyl, sec-pentyl, neo-pentyl, tert-pentyl, 3-pentyl, n-hexyl, cyclopentyl, cyclohexyl, and menthyl, and when X is O, $R^2$ may be absent. As a more specific example, the compound represented by Chemical Formula 1 may be one or more selected from the group consisting of sodium tert-pentoxide, sodium dicyclohexylamide, sodium mentholate, sodium tert-butoxide, potassium tert-pentoxide, potassium dicyclohexylamide, potassium mentholate, and potassium tert-butoxide, and in this case, there is an effect of maximizing the reactivity of the polymerization reaction.

In addition, according to an exemplary embodiment of the present invention, the compound represented by Chemical Formula 1 may be represented by the following Chemical Formula 2 or 3:

$$M^+-^-:X-R^1R^2 \quad \text{Chemical Formula 2}$$

$$M:^-{}^+X-R^1R^2 \quad \text{Chemical Formula 3}$$

wherein each substituent is as defined in the above Chemical Formula 1.

According to an exemplary embodiment of the present invention, the compound represented by Chemical Formula 1 may be added in a content of 0.26 parts by weight to 0.8 parts by weight, 0.3 parts by weight to 0.8 parts by weight, or 0.4 parts by weight to 0.6 parts by weight, based on the total content of 100 parts by weight of the aromatic vinyl monomer and the conjugated diene-based monomer which are added when preparing the block copolymer composition, and within the range, the reactivity of the polymerization reaction is improved while a side reaction is prevented, whereby the prepared block copolymer composition has increased solubility in asphalt when used with asphalt, and thus, has an effect of improving a softening point of an asphalt composition.

According to an exemplary embodiment of the present invention, the hydrocarbon-based solvent is not reacted with the polymerization initiator and any hydrocarbon-based solvent may be used as long as it is commonly used in an anion polymerization reaction. As a specific example, the hydrocarbon-based solvent may be a linear or branched aliphatic hydrocarbon compound such as butane, n-pentane, n-hexane, n-heptane, or iso-octane; a cyclic aliphatic hydrocarbon compound unsubstituted or substituted by an alkyl group such as cyclopentane, cyclohexane, cycloheptane, methyl cyclohexane, or methyl cycloheptane; or an aromatic hydrocarbon compound unsubstituted or substituted by an alkyl group such as benzene, toluene, xylene, or naphthalene, and among them, any one or a mixture of two or more may be used.

In addition, according to an exemplary embodiment of the present invention, the aromatic vinyl monomer added in step (S10) may be one or more selected from the group consisting of styrene, a-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. The aromatic vinyl monomer may be added at 10 wt % to 50 wt %, 15 wt % to 45 wt %, or 20 wt % to 40 wt %, based on the total content of the aromatic vinyl monomer and the conjugated diene-based monomer to be added, when preparing the block copolymer composition, and within the range, the content of the aromatic vinyl monomer-derived repeating unit block in the block copolymer is maintained at an appropriate level, thereby having an effect of improving mechanical physical properties of the asphalt composition including the block copolymer composition.

According to an exemplary embodiment of the present invention, step (S10) may be carried out at a temperature of 30° C. to 100° C. or 40° C. to 80° C. under a pressure of 0.1 bar to 5.0 bar or 0.5 bar to 2.0 bar, and within the range, there is an effect of minimizing prevention of by-products due to the side reaction.

In addition, according to an exemplary embodiment of the present invention, step (S10) may be carried out by further adding a Lewis base. The Lewis base may serve to improve the polarity of the monomer throughout the polymerization reaction to improve the reactivity of the polymerization reaction, and as a specific example, may be one or more selected from the group consisting of tetrahydrofuran, ditetrahydrofurylpropane, diethylether, cycloamyalether, dipropylether, ethylenemethylether, ethylenedimethylether, diethylglycol, dimethylether, tertiary butoxyethoxyethane, bis(3-dimethylaminoethyl)ether, (dimethylaminoethyl)ethylether, trimethylamine, triethylamine, tripropylamine, and tetramethylethyleneamine.

Then, according to an exemplary embodiment of the present invention, step (S20) may be a step for initiating polymerization when polymerizing the block copolymer composition to prepare the second mixed solution including a polymer for forming the aromatic vinyl monomer-derived repeating unit block for forming a block including the aromatic vinyl monomer-derived repeating unit, and the second mixed solution prepared in step (S20) may include the polymer for forming the aromatic vinyl monomer-derived repeating unit block.

According to an exemplary embodiment of the present invention, the polymerization initiator may be an organic metal compound which is different from the compound represented by Chemical Formula 1, and as a specific example, may be one or more selected from the group consisting of n-butyllithium, sec-butyllithium, tert-butyllithium, methyllithium, ethyllithium, isopropyllithium, cyclohexyllithium, allyllithium, vinyllithium, phenyllithium, and benzyllithium. The polymerization initiator may be used in a content of 0.01 mmol to 10 mmol, 0.05 mmol to 7 mmol, or 0.1 mmol to 5 mmol, based on the total content of the aromatic vinyl monomer and the conjugated diene-based monomer to be added when preparing the block copolymer composition, and within the range, there are effects that polymerization stability is excellent, the reactivity is maximized with the compound represented by Chemical Formula 1, and the physical properties of the prepared block copolymer composition are excellent.

In addition, according to an exemplary embodiment of the present invention, a mole ratio of the polymerization initiator to be added in step (S20) to the compound represented by Chemical Formula 1 to be added in step (S10) (polymerization initiator:compound represented by Chemical Formula 1) may be 1:0.05 to 1:15, 1:0.2 to 1:10, or 1:0.5 to 1:5, and in the range, there are effects of improving the reactivity of the polymerization reaction while preventing the side effect, thereby improving the softening point of the asphalt composition including the prepared block copolymer composition.

According to an exemplary embodiment of the present invention, the polymerization reaction in step (S20) may be carried out at a temperature of 30° C. to 100° C. or 40° C. to 80° C. under a pressure of 0.1 bar to 5.0 bar or 0.5 bar to 2.0 bar, and within the range, there are effects of controlling polymerization heat and allowing stable polymerization.

Meanwhile, according to an exemplary embodiment of the present invention, in the method of preparing a block copolymer composition, the polymerization initiator in step (S20) is added simultaneously with the aromatic vinyl monomer and the compound represented by Chemical Formula 1 of step (S10), whereby step (S10) and step (S20) may be carried out simultaneously, and in terms of the improvement of the polymerization reactivity, it may be preferred to carry out step (S10) first.

In addition, according to an exemplary embodiment of the present invention, step (S30) may be a step for adding the conjugated diene-based monomer and polymerizing the monomer, in the presence of the polymer for forming the aromatic vinyl monomer-derived repeating unit block included in the second mixed solution prepared in step (S20), thereby preparing the third mixed solution including a diblock copolymer including the aromatic vinyl monomer-derived repeating unit block and the conjugated diene-based monomer-derived repeating unit block. The second mixed solution prepared in step (S20) includes a polymer for forming the aromatic vinyl monomer-derived repeating unit block, and since the polymer is a leaving anion polymer which has a polymer end being in an anion active state by the polymerization of previous step (S20), step (S30) may be carried out without addition of a separate polymerization initiator. That is, step (S30) may be a step for preparing the third mixed solution including a diblock copolymer, in which a polymerization reaction between the leaving anion polymer and additionally added conjugated diene-based monomer is carried out to form the aromatic vinyl monomer-derived repeating unit block and then the block by the conjugated diene-based monomer added in step (S30).

According to an exemplary embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo refers to a halogen atom). The conjugated diene-based monomer may be added at 50 wt % to 90 wt %, 55 wt % to 85 wt %, or 60 wt % to 80 wt %, based on the total content of the aromatic vinyl monomer and the conjugated diene-based monomer to be added, when preparing the block copolymer composition, and within the range, the content of the aromatic vinyl monomer-derived repeating unit block in the block copolymer is maintained at an appropriate level, thereby having an effect of improving mechanical physical properties of the asphalt composition including the block copolymer composition.

According to an exemplary embodiment of the present invention, the polymerization reaction in step (S30) may be carried out at a temperature of 30° C. to 150° C. or 70° C. to 130° C. under a pressure of 0.1 bar to 10 bar or 0.5 bar to 5 bar, and within the range, there are effects of controlling polymerization heat and allowing stable polymerization.

Meanwhile, according to an exemplary embodiment of the present invention, even in the case where the conjugated diene-based monomer is added in step (S30), the leaving anion polymer distributed in the second mixed solution and the conjugated diene-based monomer are not brought into contact with each other so that the polymerization reaction may not be carried out. Therefore, the third mixed solution prepared by step (S30) may include the polymer including the aromatic vinyl monomer-derived repeating unit which does not undergo the polymerization reaction with the conjugated diene-based monomer, in addition to the diblock copolymer including the aromatic vinyl monomer-derived repeating unit block-conjugated diene-based monomer-derived repeating unit block.

In addition, according to an exemplary embodiment of the present invention, step (S40) may be a step for subjecting the diblock copolymer included in the third mixed solution prepared in step (S30) to a coupling reaction using a coupling agent to prepare a coupled diblock copolymer. The third mixed solution prepared in step (S30) includes the diblock copolymer, which is the leaving anion copolymer having the end of the copolymer, specifically the end of the conjugated diene-based monomer-derived repeating unit block being in an anion active state by the polymerization of previous step (S30), and thus, depending on the number of functional groups contained in the coupling agent which may be substituted or added, a coupling reaction may be performed, in which the functional group of the coupling agent may be substituted with the leaving anion copolymer, or the leaving anion copolymer is added to the functional group of the coupling agent. That is, the coupled diblock copolymer may be the copolymer in which the diblock copolymer is linked by the coupling agent, depending on the number of the functional groups contained in the coupling agent which may be substituted or added, and as a specific example, two or more diblock copolymers may be coupled by the coupling agent-derived linking group, and more specific example, two to four diblock copolymers may be coupled by the coupling agent-derived linking group.

Meanwhile, according to an exemplary embodiment of the present invention, even in the case where the coupling agent is added in step (S40), the leaving anion polymer and the diblock copolymer distributed in the third mixed solution and the coupling agent are not brought into contact with each other so that the coupling reaction may not be carried out. Therefore, the block copolymer composition prepared by the coupling reaction of step (S40) may include a polymer including the aromatic vinyl monomer-derived repeating unit which neither undergoes the polymerization reaction with the conjugated diene-based monomer nor participates in the coupling reaction, and a diblock active copolymer including the aromatic vinyl monomer-derived repeating unit block-conjugated diene-based monomer-derived repeating unit block which does not participate the coupling reaction, in addition to the coupled diblock copolymer.

According to an exemplary embodiment of the present invention, the coupling reaction in step (S40) may be carried out at a temperature of 30° C. to 150° C. or 60° C. to 130° C. under a pressure of 0.1 bar to 10 bar or 0.5 bar to 5 bar, and within the range, there is an effect of allowing stable polymerization.

In addition, according to an exemplary embodiment of the present invention, the coupling agent to be added in step (S40) may be one or more selected from the group consisting of vinyl group-containing hydrocarbon-based compounds, ester-based compounds, silane-based compounds, polysiloxane-based compounds, and polyketones, and as a specific example, the coupling agent may be one or more selected from the group consisting of vinyl group-containing hydrocarbon-based compounds such as divinylbenzene; ester-based compounds such as diethyladipate and glycidyl methacrylate; silane-based compounds such as dimethyldichlorosilane, methylchlorosilane, methoxysilane, glycidoxy trimethoxysilane, and ocydipropyl bis(trimethoxysilane); polysiloxane-based compounds such as a,co-bis(2-trichlorosilylethyl)polydimethylsiloxane; or polyketones, as a polyfunctional coupling agent. In addition, the coupling agent may be used in a content of 0.01 mmol to 10 mmol, 0.05 mmol to 7 mmol, or 0.1 mmol to 5 mmol, based on the total content of the aromatic vinyl monomer and the conjugated diene-based monomer to be added when preparing the block copolymer composition, and within the range, there are effects that a coupling efficiency is increased, the physical properties of the asphalt composition including the prepared block copoymer composition are excellent, and the softening point is raised.

In addition, according to an exemplary embodiment of the present invention, the method of preparing a block copolymer composition may selectively further include a step of adding water or alcohol to the reactor to remove activity of the polymer being in an active state, after the coupling reaction of step (S40).

In addition, the block copolymer composition according to the present invention includes the aromatic vinyl monomer-derived repeating unit block, the conjugated diene-based monomer-derived repeating unit block, and the coupling agent-derived linking group, and a coupling efficiency by the coupling agent-derived linking group may be 50% to 80%. The block copolymer composition may be a block copolymer composition prepared by the method of preparing a block copolymer composition as described above.

According to an exemplary embodiment of the present invention, the block copolymer composition may have a weight average molecular weight of 10,000 g/mol to 500,000 g/mol, 30,000 g/mol to 300,000 g/mol, or 50,000 g/mol to 200,000 g/mol, and a coupling efficiency by the coupling agent-derived linking group of 50% to 80%, 60% to 80%, or 70% to 80%. In addition, the total content of the aromatic vinyl monomer-derived repeating unit in the block copolymer may be 10 wt % to 50 wt %, 15 wt % to 45 wt %, or 20 wt % to 40 wt %, based on the total content of the block copolymer, and the vinyl content in the conjugated diene-based monomer-derived repeating unit block may be 10 mol % to 50 mol %, 15 mol % to 40 mol %, or 20 mol % to 30 mol %, based on the total content of the conjugated diene-based monomer-derived repeating unit. The weight average molecular weight, the coupling efficiency, the content of the aromatic vinyl monomer-derived repeating unit, and the content of vinyl in the conjugated diene-based monomer-derived repeating unit block are related to the structural characteristics of the block copolymer, and when the above ranges are satisfied, there is an effect that the mechanical physical properties of the asphalt composition including the block copolymer composition as a modifier are excellent.

Meanwhile, the coupling efficiency may be calculated by the following Equation 1:

Equation 1

Coupling efficiency (%)={(area of coupled polymer)/(area of entire polymer)} X 100

In addition, according to the present invention, an asphalt composition including the block copolymer composition as an asphalt modifier is provided. The asphalt composition may include the block copolymer composition and asphalt. Here, the block copolymer composition may be included at 1 wt % to 10 wt %, 3 wt % to 8 wt %, or 4 wt % to 6 wt %, based on the total content of the asphalt composition, and within the range, there are effects that the block copolymer composition has excellent solubility in asphalt and the physical properties of the asphalt composition are excellent.

According to an exemplary embodiment of the present invention, the asphalt composition may further include a crosslinking agent for crosslinking the asphalt composition. The crosslinking agent may be a sulfur compound containing sulfur or iron sulfate, and as a specific example, may be a sulfur element (powder), and the crosslinking agent may be included at 0.01 parts by weight to 3 parts by weight, 0.05 parts by weight to 1 part by weight, or 0.05 parts by weight to 0.5 parts by weight, based on the total content of 100 parts by weight of the asphalt and the block copolymer composition, and within the range, there are effects of maintaining an appropriate crosslinking reaction to improve physical properties at high temperature and elasticity and preventing gelation.

In addition, according to an exemplary embodiment of the present invention, the asphalt composition has a softening point of 71.2° C. or more, or 72.5° C. to 75.5° C., as measured according to ASTM D36, elongation of 39.6 cm or more, or 40.3 cm to 41.3 cm, as measured according to ASTM D113, and viscosity at 160° C. of 428 cps or less, or 405 cps to 422 cps, as measured according to ASTM D4402. In addition, the asphalt composition may have a phase separation temperature of 4.5° C. or less, 0° C. to 4.5° C., or 2.3° C. to 2.7° C., and within the range, there is an effect that the compatibility between the block copolymer composition and asphalt is excellent, so that the mechanical physical properties of the asphalt composition are excellent.

In addition, according to an exemplary embodiment of the present invention, when the asphalt composition further includes the crosslinking agent, the asphalt composition has a softening point of 83.6° C. or more, or 84.3° C. to 86.5° C., as measured according to ASTM D36, elongation of 30 cm or more, or 31.0 cm to 33.3 cm, as measured according to ASTM D113, and viscosity at 160° C. of 598 cps or less, or 570 cps to 588 cps, as measured according to ASTM D4402. In addition, when the asphalt composition further includes the crosslinking agent, the asphalt composition may have a phase separation temperature of 3° C. or less, 0° C. to 3° C., or 1.2° C. to 1.7° C., and within the range, there is an effect that the compatibility between the block copolymer composition and asphalt is excellent, so that the mechanical physical properties of the asphalt composition are excellent.

In addition, according to an exemplary embodiment of the present invention, the asphalt composition may be building materials such as road pavement materials or water-proof materials.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

A reactor of 10 L substituted with argon was set to a temperature of 50° C. and a pressure of 1.0 bar, and 5,000 g of cyclohexane, 300 g of styrene, and 50 g of tetrahydrofuran were added thereto and stirred. During stirring, 5 g of sodium tert-pentoxide was added and further stirred for 10 minutes. Then, 35 g of n-butyllithium was added to initiate polymerization. After initiation of polymerization and after 10 minutes after a polymerization temperature reached the maximum temperature of 80° C., 700 g of 1,3-butadiene was added to perform polymerization. Then, 10 minutes after a polymerization temperature reached the maximum temperature of 120° C., 1 g of dimethylchlorosilane as a coupling agent was added. 10 minutes after adding the coupling agent, methanol was added to terminate polymerization, stirring was performed for 10 minutes, and then 5 g of Irganox 1076 (available from BASF) as an antioxidant was added. Finally, cyclohexane added as a solvent was removed using a roll mill, thereby preparing a block copolymer composition.

Example 2

The process was carried out in the same manner as in Example 1, except that in Example 1, 5 g of sodium dicyclohexylamide was added instead of sodium tert-pentoxide.

Example 3

The process was carried out in the same manner as in Example 1, except that in Example 1, 5 g of sodium mentholate was added instead of sodium tert-pentoxide.

Example 4

The process was carried out in the same manner as in Example 1, except that in Example 1, 5 g of sodium tert-butoxide was added instead of sodium tert-pentoxide.

Example 5

The process was carried out in the same manner as in Example 1, except that in Example 1, 5 g of potassium tert-pentoxide was added instead of sodium tert-pentoxide.

Example 6

The process was carried out in the same manner as in Example 1, except that in Example 1, 5 g of potassium dicyclohexylamide was added instead of sodium tert-pentoxide.

Example 7

The process was carried out in the same manner as in Example 1, except that in Example 1, 5 g of potassium mentholate was added instead of sodium tert-pentoxide.

Example 8

The process was carried out in the same manner as in Example 1, except that in Example 1, 5 g of potassium tert-butoxide was added instead of sodium tert-pentoxide.

Comparative Example 1

The process was carried out in the same manner as in Example 1, except that in Example 1, sodium tert-pentoxide was not added.

Comparative Example 2

The process was carried out in the same manner as in Example 1, except that in Example 1, 5.8 g of sodium dimethoxymethylsilane was added instead of 5 g of sodium tert-pentoxide.

Comparative Example 3

The process was carried out in the same manner as in Example 1, except that in Example 1, 9.1 g of sodium 4-methylcyclohexane-1-sulfonate was added instead of 5 g of sodium tert-pentoxide.

Comparative Example 4

The process was carried out in the same manner as in Example 1, except that in Example 1, 9.5 g of sodium 2-naphthalenesulfonate was added instead of 5 g of sodium tert-pentoxide.

Comparative Example 5

The process was carried out in the same manner as in Example 1, except that in Example 1, 12 g of sodium tert-pentoxide was added instead of 5 g of sodium tert-pentoxide.

Comparative Example 6

The process was carried out in the same manner as in Example 1, except that in Example 1, 0.05 g of sodium tert-pentoxide was added instead of 5 g of sodium tert-pentoxide.

Comparative Example 7

A reactor of 10 L substituted with argon was set to a temperature of 50° C. and a pressure of 1.0 bar, and 5,000 g of cyclohexane, 300 g of styrene, and 50 g of tetrahydrofuran were added thereto and stirred. During stirring, 35 g of n-butyllithium and 5 g of sodium tert-pentoxide were added to initiate polymerization. After initiation of polymerization and after 10 minutes after a polymerization temperature reached the maximum temperature of 80° C., 700 g of 1,3-butadiene was added to perform polymerization. Then, 10 minutes after a polymerization temperature reached the maximum temperature of 120° C., 1 g of dimethylchlorosilane as a coupling agent was added. 10 minutes after adding the coupling agent, methanol was added to terminate polymerization, stirring was performed for 10 minutes, and then 5 g of Irganox 1076 (available from BASF) as an antioxidant was added. Finally, cyclohexane added as a solvent was removed using a roll mill, thereby preparing a block copolymer composition.

EXPERIMENTAL EXAMPLE

Experimental Example 1

The weight average molecular weight (Mw, X $10^3$ g/mol), the coupling efficiency (C/E, %), the content of styrene-derived repeating unit (SM) (wt %), and the content of vinyl in a 1,3-butadiene-derived repeating unit (mol %) of the block copolymer in each of the block copolymer compositions prepared in Examples 1 to 8 and Comparative Examples 1 to 7 are shown in Tables 1 and 2. The weight average molecular weights and each of the contents were measured by gel permeation chromatograph (GPC) analysis, and the coupling efficiency were calculated by the following Equation 1 and shown.

For the GPC analysis, two PLgel Olexis (available from Polymer Laboratories, Ltd.) columns and one PLgel mixed-C (available from Polymer Laboratories, Ltd.) column were combined and used. When the molecular weight was calculated, polystyrene (PS) was used as a GPC standard material:

$$\text{Coupling efficiency (\%)} = \{(\text{area of coupled polymer})/(\text{area of entire polymer})\} \times 100 \quad \text{[Equation 1]}$$

TABLE 1

| Classification | Example |  |  |  |  |  |  |  |
|---|---|---|---|---|---|---|---|---|
|  | 1 | 2 | 3 | 4 | 5 | 6 | 7 | 8 |
| Mw (×$10^3$ g/mol) | 110 | 105 | 115 | 107 | 110.3 | 115.2 | 101 | 113 |
| C/E (%) | 75 | 78 | 76 | 77 | 75 | 76 | 79 | 76 |
| SM (wt %) | 30.3 | 30.5 | 30.3 | 30.2 | 30.0 | 30.2 | 30.1 | 30.3 |
| Vinyl (mol %) | 27 | 26 | 25 | 28 | 27 | 25 | 24 | 27 |

TABLE 2

| Classification | Comparative Example |  |  |  |  |  |  |
|---|---|---|---|---|---|---|---|
|  | 1 | 2 | 3 | 4 | 5 | 6 | 7 |
| Mw (×$10^3$ g/mol) | 108 | 118 | 111 | 113 | 109 | 109 | 112 |
| C/E (%) | 83 | 73 | 74 | 72 | 74 | 84 | 82 |
| SM (wt %) | 30.1 | 30.2 | 30.3 | 30.2 | 30.1 | 30.1 | 30.3 |
| Vinyl (mol %) | 24 | 26 | 25 | 26 | 28 | 24 | 25 |

As shown in Tables 1 and 2, it was confirmed that the block copolymer compositions of Examples 1 to 8 prepared by the present invention and the block copolymer compositions of Comparative Examples 1 to 7 exhibit the equivalent levels of weight average molecular weights, a coupling efficiency, styrene contents and vinyl contents.

Experimental Example 2

For comparison of the physical property change in the softening point, elongation, and viscosity, when each of the block copolymer compositions prepared in Examples 1 to 8 and Comparative Examples 1 to 7 was used as an asphalt modifier, 23.4 g of each of the block copolymer compositions prepared in Examples 1 to 8 and Comparative Examples 1 to 7 was added to 600 g of asphalt (SK AP-5) under the condition of 180° C., then mixed at 2,500 rpm for 60 minutes in a high shear mixer (HSM), and then stirred at 300 rpm for 120 minutes in a low shear mixer (LSM) to prepare an asphalt composition specimen, and the softening point, the elongation, the viscosity, and the phase separation temperature were measured and shown in Tables 3 and 4.

* Softening point (° C.): in accordance with ASTM D36, when heating water or glycerin by 5° C. per 1 minute, the asphalt composition specimen started to be softened by the heating, and the temperature when a bead having a diameter of 9.525 mm and a weight of 3.5 g, disposed on the specimen fell by 1 inch was measured.

* Elongation (cm, at 5° C.): in accordance with ASTM D113, when the asphalt composition specimen was pulled in both directions in a thermostat maintained at 5° C., the increased length of the specimen immediately before the specimen was broken was measured.

* Viscosity (cps): after the asphalt composition was prepared, the viscosity at 160° C. was measured using Brookfiled DV-II+Pro Model under the condition of spindle 27 in accordance with ASTM D4402.

* Phase separation temperature (° C.): 50 g of the asphalt composition was weighed in an aluminum tube, stored in an oven at 163° C. for 48 hours, stored in a cooler at −5° C. for 4 hours or more, and then divided into three equal parts, thereby measuring the softening points of the upper part and the lower part in accordance with ASTM D36, and the phase separation temperature was calculated from the difference between the measured softening points. When the phase separation temperature is within 3° C., it means that phase separation does not occur, and as the difference in the softening point is smaller, it means that the solubility in asphalt is better.

TABLE 3

| Classification | Example | | | | | | | |
|---|---|---|---|---|---|---|---|---|
| | 1 | 2 | 3 | 4 | 5 | 6 | 7 | 8 |
| Softening point | 72.5 | 75.5 | 73.5 | 74.0 | 73.5 | 75.0 | 74.5 | 75.0 |
| Elongation | 40.3 | 41.1 | 40.8 | 40.5 | 40.9 | 41.3 | 40.7 | 41.0 |
| Viscosity | 421 | 411 | 418 | 405 | 410 | 418 | 413 | 422 |
| Phase separation temperature | 2.5 | 2.6 | 2.7 | 2.4 | 2.3 | 2.5 | 2.5 | 2.3 |

TABLE 4

| Classification | Comparative Example | | | | | | |
|---|---|---|---|---|---|---|---|
| | 1 | 2 | 3 | 4 | 5 | 6 | 7 |
| Softening point | 69.5 | 68.0 | 68.5 | 69.0 | 69.7 | 69.8 | 69.3 |
| Elongation | 37.5 | 38.4 | 38.8 | 37.3 | 37.2 | 37.5 | 38.6 |
| Viscosity | 445 | 440 | 438 | 441 | 436 | 443 | 440 |
| Phase separation temperature | 7.5 | 7.0 | 7.2 | 7.3 | 6.5 | 7.3 | 6.2 |

As shown in the above Tables 3 and 4, when the block copolymer compositions of Examples 1 to 8 prepared by adding the compound represented by Chemical Formula 1 according to the present invention were used for asphalt modification, it was confirmed that the softening point was raised, the elongation and the viscosity were improved also, and no phase separation occurs, as compared with Comparative Example 1 to which the compound represented by Chemical Formula 1 was not added.

However, in Comparative Examples 2 to 4 to which a sodium silane-based compound and a sodium sulfonate-based compound were added instead of the compound represented by Chemical Formula 1, the softening point, the elongation, the viscosity, and the phase separation temperature were all in the similar level to Comparative Example 1.

In addition, even when the compound represented by Chemical Formula 1 was added, it was confirmed that in Comparative Example 5 to which the compound was added in excess, polymerization reactivity was excessively improved so that rather the improvement effect was not exhibited, and in Comparative Example 6 to which a trace amount of the compound was added, the degree of polymerization reactivity improvement was very low, so that the improvement effect was not exhibited.

In addition, even when the compound represented by Chemical Formula 1 was added, it was confirmed that also in Comparative Example 7 in which the compound was added simultaneously with the polymerization initiator, unlike the present invention in which the compound was stirred with the aromatic vinyl monomer in the hydrocarbon-based solvent, the polymerization initiator having high polymerization reactivity was added simultaneously in the state that the compound of Chemical Formula 1 was not evenly dispersed, and thus, the improvement of the polymerization reactivity was not substantially expressed by the compound represented by Chemical Formula 1, so that the improvement effect was not exhibited.

Experimental Example 3

For comparison of the physical property change in the softening point, elongation, viscosity, and phase separation temperature, when each of the block copolymer compositions prepared in Examples 1 to 8 and Comparative Examples 1 to 7 was used as an asphalt modifier and the crosslinking agent was included, 23.4 g of each of the block copolymer compositions prepared in Examples 1 to 8 and Comparative Examples 1 to 7 was added to 600 g of asphalt (SK AP-6) under the condition of 180° C., then mixed at 2,500 rpm for 60 minutes in a high shear mixer (HSM), then 0.1 parts by weight of sulfur powder was added based on the total content of 100 parts by weight of the asphalt and the block copolymer composition, and then stirred at 300 rpm for 120 minutes in a low shear mixer (LSM) to prepare an asphalt composition specimen, and the softening point, the elongation, the viscosity, and the phase separation temperature were measured in the same manner as in Experimental Example 2 and shown in Tables 5 and 6.

TABLE 5

| Classification | Example | | | | | | | |
|---|---|---|---|---|---|---|---|---|
| | 1 | 2 | 3 | 4 | 5 | 6 | 7 | 8 |
| Softening point | 85.3 | 86.5 | 86.3 | 85.2 | 84.3 | 86.5 | 84.4 | 86.2 |
| Elongation | 31.3 | 32.2 | 31.5 | 33.3 | 32.1 | 33.0 | 31.0 | 32.8 |
| Viscosity | 580 | 570 | 585 | 577 | 583 | 588 | 573 | 568 |
| Phase separation temperature | 1.2 | 1.5 | 1.7 | 1.6 | 1.3 | 1.4 | 1.6 | 1.5 |

TABLE 6

| Classification | Comparative Example | | | | | | |
|---|---|---|---|---|---|---|---|
| | 1 | 2 | 3 | 4 | 5 | 6 | 7 |
| Softening point | 81.3 | 82.0 | 81.8 | 82.2 | 82.8 | 82.5 | 82.9 |
| Elongation | 27.5 | 27.0 | 28.2 | 28.5 | 28.8 | 28.0 | 28.3 |
| Viscosity | 613 | 625 | 644 | 630 | 610 | 611 | 622 |
| Phase separation temperature | 5.3 | 5.8 | 5.1 | 4.8 | 4.5 | 4.8 | 4.6 |

As shown in the above Tables 5 and 6, even when the block copolymer compositions of Examples 1 to 8 prepared by adding the compound represented by Chemical Formula 1 according to the present invention were used for asphalt modification and the crosslinking agent was further included, it was confirmed that the softening point was raised, and also the elongation, viscosity and phase separation temperature were improved as compared with Comparative Example 1 to which the compound represented by Chemical Formula 1 was not added.

However, in Comparative Examples 2 to 4 to which a sodium silane-based compound and a sodium sulfonate-based compound were added instead of the compound represented by Chemical Formula 1, likewise, the softening point, elongation, viscosity, and phase separation temperature were all exhibited in the similar level to Comparative Example 1, and even when the compound represented by Chemical Formula 1 was added, it was confirmed that in Comparative Example 5 to which the compound was added in excess, polymerization reactivity was excessively improved, so that rather the improvement effect was not exhibited, and in Comparative Example 6 to which a trace amount of the compound was added, the degree of polymerization reactivity improvement was very low, so that the improvement effect was not exhibited.

In addition, even when the compound represented by Chemical Formula 1 was added, it was confirmed that also in Comparative Example 7 in which the compound was added simultaneously with the polymerization initiator, unlike the present invention in which the compound was stirred with the aromatic vinyl monomer in the hydrocarbon-based solvent, the polymerization initiator having high polymerization reactivity was added simultaneously in the state that the compound of Chemical Formula 1 was not evenly dispersed, and thus, the improvement of the polymerization reactivity was not substantially expressed by the compound represented by Chemical Formula 1, so that the improvement effect was not exhibited.

From the above results, the inventors of the present invention were able to confirm that when the block copolymer composition was prepared according to the present invention, and the block copolymer composition prepared therefrom was used as an asphalt modifier, the entire physical properties of an asphalt composition, that is, polymer modified asphalt were maintained at the same or a higher level, while a softening point is raised.

The invention claimed is:

1. A method of preparing a block copolymer composition, comprising:
   adding an aromatic vinyl monomer and a compound represented by the following Chemical Formula 1 to a hydrocarbon-based solvent and performing stirring to prepare a first mixed solution;
   adding a polymerization initiator to the first mixed solution and performing polymerization to prepare a second mixed solution;
   adding a conjugated diene-based monomer to the second mixed solution and performing polymerization to prepare a third mixed solution; and
   adding a coupling agent to the third mixed solution to perform a coupling reaction, wherein the compound represented by the following Chemical Formula 1 is added in a content of 0.26 parts by weight to 0.8 parts by weight, based on a total content of 100 parts by weight of the aromatic vinyl monomer and the conjugated diene-based monomer:

$$M\text{-}X\text{—}R^1R^2 \qquad \text{Chemical Formula 1}$$

wherein
M is Li, Na, K, Rb or Cs,
X is N, O, or S, and
$R^1$ and $R^2$ are independently of each other a monovalent hydrocarbon group having 1 to 12 carbon atoms or a monovalent hydrocarbon group having 1 to 12 carbon atoms containing a N or O atom, wherein when X is O or S, $R^2$ is absent.

2. The method of claim 1,
wherein
M is Na or K,
X is N or O, and
$R^1$ and $R^2$ are independently of each other a monovalent hydrocarbon group having 4 to 10 carbon atoms, wherein when X is O, $R^2$ is absent.

3. The method of claim 1, wherein the compound represented by Chemical Formula 1 is one or more selected from the group consisting of sodium tert-pentoxide, sodium dicyclohexylamide, sodium mentholate, sodium tert-butoxide, potassium tert-pentoxide, potassium dicyclohexylamide, potassium mentholate, and potassium tert-butoxide.

4. The method of claim 1, wherein the polymerization initiator is one or more selected from the group consisting of n-butyllithium, sec-butyllithium, tert-butyllithium, methyllithium, ethyllithium, isopropyllithium, cyclohexyllithium, allyllithium, vinyllithium, phenyllithium, and benzyllithium.

5. The method of claim 1, wherein a mole ratio of the polymerization initiator to the compound represented by Chemical Formula 1 (polymerization initiator:compound represented by Chemical Formula 1) is 1:0.05 to 1:15.

* * * * *